United States Patent
Huynh et al.

(10) Patent No.: US 10,783,301 B2
(45) Date of Patent: Sep. 22, 2020

(54) ANALYZING DELAY VARIATIONS AND TRANSITION TIME VARIATIONS FOR ELECTRONIC CIRCUITS

(71) Applicant: Synopsys, Inc., Mountain View, CA (US)

(72) Inventors: Duc Huynh, San Jose, CA (US);
Jiayong Le, Santa Clara, CA (US);
Ayhan Mutlu, Santa Clara, CA (US);
Peivand Tehrani, Campbell, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/293,313

(22) Filed: Mar. 5, 2019

(65) Prior Publication Data

US 2019/0197212 A1    Jun. 27, 2019

Related U.S. Application Data

(62) Division of application No. 15/067,576, filed on Mar. 11, 2016, now Pat. No. 10,255,395.

(51) Int. Cl.
*G06F 30/3312* (2020.01)
*G06F 111/08* (2020.01)
*G06F 119/12* (2020.01)

(52) U.S. Cl.
CPC ...... *G06F 30/3312* (2020.01); *G06F 2111/08* (2020.01); *G06F 2119/12* (2020.01)

(58) Field of Classification Search
CPC ............ G06F 30/3312; G06F 2119/12; G06F 2111/08; G06F 2217/84; G06F 2217/10; G06F 17/5031
See application file for complete search history.

(56) References Cited

U.S. PATENT DOCUMENTS

| | | | | |
|---|---|---|---|---|
| 8,302,046 | B1 * | 10/2012 | Keller | G06F 17/5031 |
| | | | | 716/108 |
| 8,307,317 | B2 * | 11/2012 | Adams | G06F 17/5031 |
| | | | | 716/113 |
| 8,407,640 | B2 | 3/2013 | Le et al. | |
| 8,555,222 | B2 | 10/2013 | Le et al. | |

(Continued)

OTHER PUBLICATIONS

Chapter 18: On-Chip Variation (OCV) Modeling, Library Compiler™ User Guide, Version K-2015.12-SP2, 2015, 22 pages.

*Primary Examiner* — Nha T Nguyen
(74) *Attorney, Agent, or Firm* — Fenwick & West LLP

(57) ABSTRACT

A system receives a circuit description and measures of intrinsic delay, intrinsic delay variation, transition time and transition time variation for each stage and determines stage delay variation of each stage. The system receives a circuit description and derate factors and determines an intrinsic delay standard deviation and a correlation coefficient. The system determines a stage delay variation of each stage based on the determined factors. The system receives parameters describing an asymmetric distribution of delay values and generates a normal distribution of delay values. The system receives measures of nominal transition time at an output and input of a wire, and transition time variation at the input of the wire and determines a transition time variation at the output of the wire. The system receives measures of an Elmore delay and a nominal delay of the wire and determines a delay variation at the output of the wire.

20 Claims, 10 Drawing Sheets

(56) References Cited

U.S. PATENT DOCUMENTS

| | | | | |
|---|---|---|---|---|
| 8,595,669 B1* | 11/2013 | Keller | G06F 17/5036 | 716/106 |
| 8,656,331 B1* | 2/2014 | Sundareswaran | G06F 17/5036 | 716/113 |
| 10,031,986 B1* | 7/2018 | Kumar | G06F 17/5036 | |
| 2006/0085775 A1* | 4/2006 | Chang | G06F 17/5031 | 716/108 |
| 2006/0112158 A1* | 5/2006 | Tetelbaum | G06F 17/5031 | 708/490 |
| 2007/0073500 A1* | 3/2007 | Yoshikawa | G06F 17/5031 | 702/79 |
| 2007/0266357 A1* | 11/2007 | Kimata | G06F 17/5031 | 716/113 |
| 2010/0030516 A1* | 2/2010 | Kambara | G06F 17/5031 | 702/179 |
| 2010/0287517 A1* | 11/2010 | Buss | H03G 7/007 | 716/113 |
| 2011/0035715 A1* | 2/2011 | Lu | G06F 17/5031 | 716/108 |
| 2012/0072880 A1* | 3/2012 | Le | G06F 17/5031 | 716/113 |
| 2012/0284680 A1* | 11/2012 | Iyer | G06F 17/5031 | 716/113 |
| 2013/0227510 A1* | 8/2013 | Katz | G06F 17/5031 | 716/113 |
| 2015/0121396 A1* | 4/2015 | Martinez Canedo | G06F 8/4452 | 718/105 |
| 2016/0364517 A1* | 12/2016 | Pelloie | G06F 17/5031 | |

* cited by examiner

ANALYZING DELAY VARIATIONS AND TRANSITION TIME VARIATIONS FOR ELECTRONIC CIRCUITS

CROSS REFERENCE TO RELATED APPLICATIONS

This application is a divisional of U.S. application Ser. No. 15/067,576, filed Mar. 11, 2016, now U.S. Pat. No. 10,255,395, which is incorporated by reference in its entirety.

BACKGROUND

1. Field of Art

The disclosure generally relates to statistical static timing analysis of electronic circuits and more specifically to analyzing delay variations and transition time variations in statistical static timing analysis of electronic circuits.

2. Description of the Related Art

Conventional ways of performing timing analysis of circuits include simulation based approaches. As the complexity of integrated circuits (ICs) grows, using simulation based approaches to verify timing constraints become impractical in view of long runtimes, low capacities, and incomplete analysis.

Another technique for performing timing analysis of circuits is static timing analysis (STA). Unlike the simulation based approaches, STA verifies timing by computing worst-case delays without enumerating all possible paths. Thus, STA can perform a thorough timing analysis for large ICs within a reasonable amount of time. Therefore, STA is the method of choice for verifying timing constraints for large ICs.

Design and fabrication of ICs involve complex physical and chemical processes which cause on-chip variation (OCV) of timing-related parameters. Typically, STA techniques model this OCV using global derating parameters used to determine delays to reflect OCV. Applying global derating parameters to each delay value often ignores context or location regarding the delay.

As the density of integrated circuits (ICs) increases, the dimension of the transistors becomes smaller. Furthermore there is a trend towards decreasing the operating voltage of circuits. As transistors become smaller and operating voltage continues dropping, local random variation becomes increasingly important for the performance of ICs. Various models are being developed to analyze local random variations and determine delay variations and transition time variations. However, conventional techniques are deficient in determining the impact of local random variations on the overall circuit.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
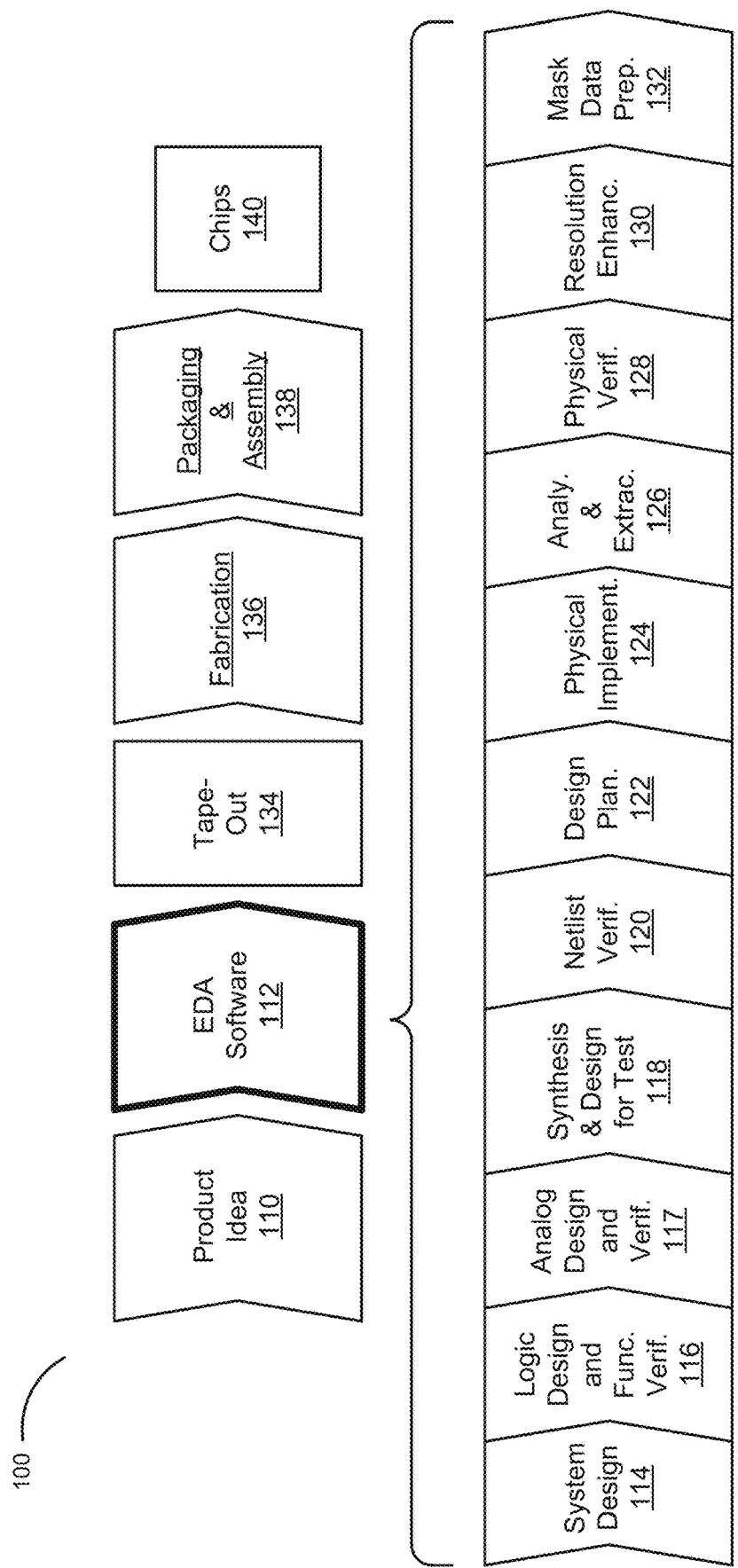
FIG. 1 shows a flow chart illustrating various operations in the design and fabrication of an integrated circuit, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and computer readable storage medium for performing static timing analysis are disclosed herein. In one embodiment, a static timing analyzer receives a digital representation of an electronic circuit. The circuit includes paths and each path of the circuit includes one or more stages. For each stage of the path, the static timing analyzer receives, or otherwise accesses, from a library, measures of intrinsic delay, intrinsic delay variation, transition time, and transition time variation. For a first stage of the path, the static timing analyzer determines a stage delay variation at an output of the first stage based on the intrinsic delay and the transition time of the first stage. For each stage following the first stage in the path, where inputs of the stage are coupled to outputs of a previous stage, the static timing analyzer determines a covariance delay term and stage delay variation. The static timing analyzer determines the covariance delay term based on the stage and a previous stage and determines the stage delay variation based on the received intrinsic delay variation of the stage and the covariance delay term.

An OCV analysis scales the path delays by a fixed percentage called global derate factor value. For example, the path delays may be increased by 20 percent by scaling the path delays by a global derate factor value 1.2 or path delays may be decreased by 20 percent by scaling the path delay values by a global derate factor value 0.8. The global derate factor value may vary based on a stage count. The stage counts represent a number of stages of paths of the circuit. In an embodiment, the static timing analyzer receives a mapping from stage counts to global derate factor values. The mapping may be represented as a table that stores tuples (n, v) where n is the stage count and v is the global derate factor value for stage count n. Accordingly, global derate factor values represent a measure of stage delay variation for paths having a given number of stages, where the measure of stage delay variation is specified on a per stage basis. For example, the mapping may specify a global derate factor value v1 for stage count 1, v2 for stage count 2, v3 for stage count 3, vn for stage count n, and so on. Accordingly, the mapping indicates that for paths having n stages, the stage delay variation per stage is vn. Typically, the global derate factor values decrease as the stage count increases. The static timing analyzer determines a plurality of parameters including an intrinsic delay standard deviation and a correlation coefficient based on the mapping from the stage counts to the global derate factor values. The static timing analyzer determines a stage delay variation for stages in a path based on the determined plurality of parameters.

In another embodiment, the static timing analyzer receives information describing distribution of delay values for a circuit including a mean value and parameters describing an asymmetric distribution. These parameters include a first standard deviation of delay values that are less than the mean value and a second standard deviation of delay values that are higher than the mean value. The system generates parameters describing delay values having a normal distribution from the parameters describing delay values having the received asymmetric distribution of delay value parameters. The system performs statistical static timing analysis of the circuit propagates the delay values based on normal distribution in accordance with a parametric on-chip variation (POCV) methodology.

In another embodiment, the static timing analyzer receives or otherwise accesses from a library, for each wire joining the stages of the path, measures of nominal transition time at an output of each wire, a nominal transition time at an input of each wire, and a transition time variation at the input of each wire. For each wire joining the stages of the path, the static timing analyzer determines a transition time variation at the output of the wire based on the received parameters.

In another embodiment, the static timing analyzer further receives, or otherwise accesses, parameters comprising measures of an estimate of a delay through an RC network and a nominal delay at the output of each wire. For example, the estimate of delay through the RC network is an Elmore delay. For each wire joining the stages of the path, the static timing analyzer determines a delay variation at the output of wire based on the received parameters.

Overview of EDA Design Flow

FIG. 1 is a flowchart 100 illustrating the various operations in the design and fabrication of an integrated circuit. This process starts with the generation of a product idea 110, which is realized during a design process that uses electronic design automation (EDA) software 112. When the design is finalized, it can be taped-out 134. After tape-out, a semiconductor die is fabricated 136 to form the various objects (e.g., gates, metal layers, vias) in the integrated circuit design. Packaging and assembly processes 138 are performed, which result in finished chips 140.

Figure 10:
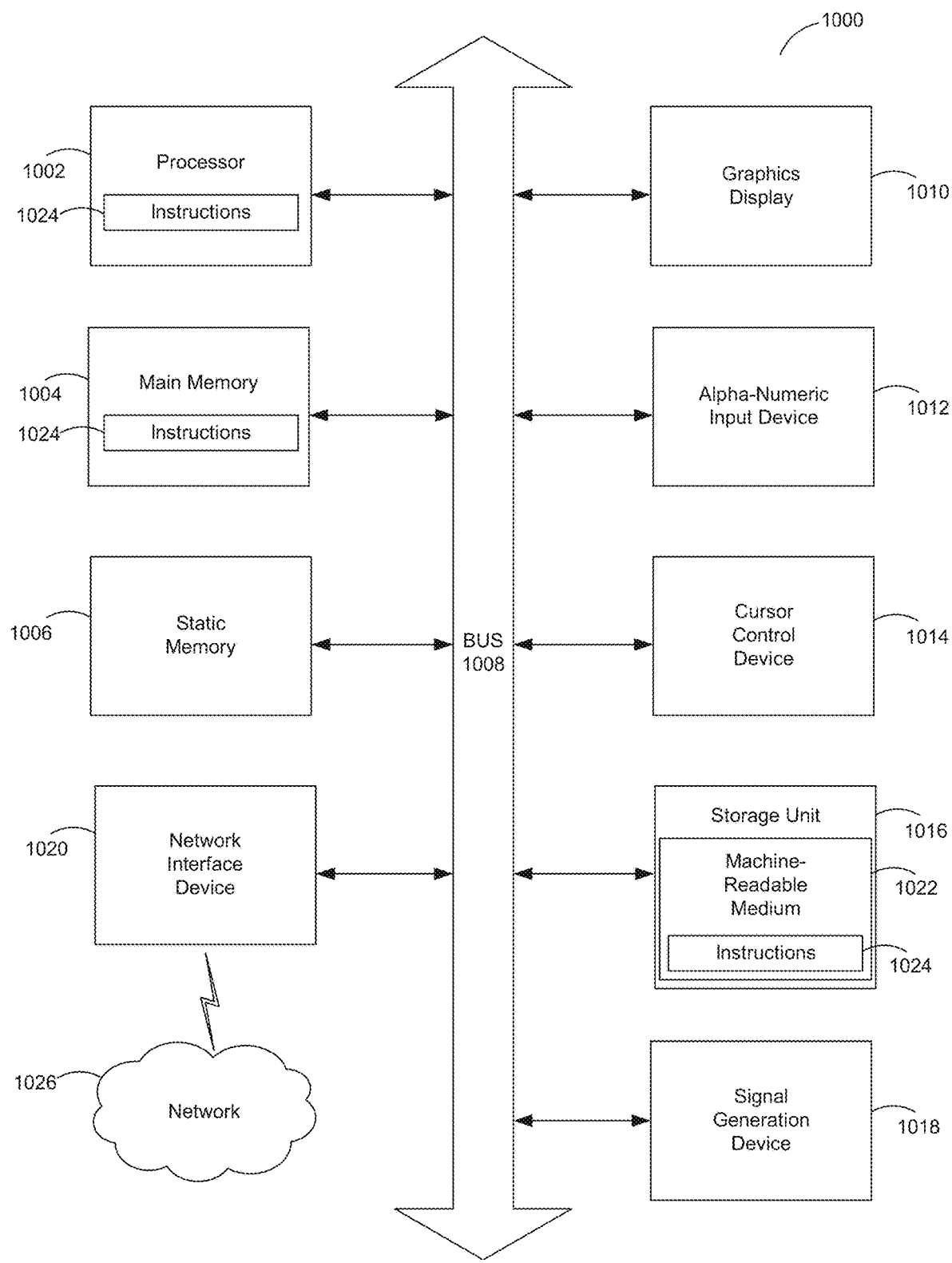
FIG. 10 illustrates one embodiment of components of an example machine able to read instructions from a machine-readable medium and execute them in a processor (or controller).

The EDA software 112 may be implemented in one or more computing devices such as the computer 1000 of FIG. 10. For example, the EDA software 112 is stored as instructions in the computer-readable medium which are executed by a processor for performing operations 114-132 of the design flow, which are described below. This design flow description is for illustration purposes. In particular, this description is not meant to limit the present disclosure. For example, an actual integrated circuit design may require a designer to perform the design operations in a difference sequence than the sequence described herein.

During system design 114, designers describe the functionality to implement. They can also perform what-if planning to refine the functionality and to check costs. Note that hardware-software architecture partitioning can occur at this stage. Example EDA software products from Synopsys, Inc. of Mountain View, Calif. that can be used at this stage include: Model Architect®, Saber®, System Studio®, and Designware® products.

During logic design and functional verification 116, VHDL or Verilog code for modules in the circuit is written and the design is checked for functional accuracy. More specifically, the design is checked to ensure that it produces the correct outputs. Example EDA software products from Synopsys, Inc. of Mountain View, Calif. that can be used at this stage include: VCS®, Vera®, 10 Designware®, Magellan®, Formality®, ESP® and Leda® products.

During analog design, layout, and simulation 117, analog circuits are designed, layed out, and simulated to ensure both functionality and performance. Example EDA software products from Synopsys, Inc. of Mountain View, Calif. that can be used at this stage include: Custom Designer®, Hspice®, HspiceRF®, XA®, Nanosim®, HSim®, and Finesim® products.

During synthesis and design for test 118, VHDL/Verilog is translated to a netlist. This netlist can be optimized for the target technology. Additionally, tests can be designed and implemented to check the finished chips. Example EDA software products from Synopsys, Inc. of Mountain View, Calif. that can be used at this stage include: Design Compiler®, Physical Compiler®, Test Compiler®, Power Compiler®, FPGA Compiler®, Tetramax®, and Designware® products.

During netlist verification 120, the netlist is checked for compliance with timing constraints and for correspondence with the VHDL/Verilog source code. Example EDA software products from Synopsys, Inc. of Mountain View, Calif. that can be used at this stage include: Formality®, PrimeTime®, and VCS® products.

During design planning 122, an overall floor plan for the chip is constructed and analyzed for timing and top-level routing. Example EDA software products from Synopsys, Inc. of Mountain View, Calif. that can be used at this stage include: Astro® and IC Compiler® products.

During physical implementation 124, the placement (positioning of circuit elements) and routing (connection of the same) occurs. Example EDA software products from Synopsys, Inc. of Mountain View, Calif. that can be used at this stage include: the Astro® and IC Compiler® products.

During analysis and extraction 126, the circuit function is verified at a transistor level, which permits refinement. Example EDA software products from Synopsys, Inc. of Mountain View, Calif. that can be used at this stage include: Astrorail®, Primerail®, PrimeTime®, and Star RC/XT® products.

During physical verification 128, the design is checked to ensure correctness for: manufacturing, electrical issues, lithographic issues, and circuitry. Example EDA software products from Synopsys, Inc. of Mountain View, Calif. that can be used at this stage include the Hercules® product.

During resolution enhancement 130, geometric manipulations of the layout are performed to improve manufacturability of the design. Example EDA software products from Synopsys, Inc. of Mountain View, Calif. that can be used at this stage include: Proteus®, Proteus® AF, and PSMGED® products.

During mask-data preparation 132, the 'tape-out' data for production of masks to produce finished chips is provided. Example EDA software products from Synopsys, Inc. of Mountain View, Calif. that can be used at this stage include the CATS® family of products.

Embodiments of the present disclosure can be used during one or more of the above-described stages. Specifically, embodiments may be used for the processes of analog design, layout, and simulation 117, analysis and extraction 126, and physical verification 128. Accordingly, a digital representation of an electronic circuit is analyzed based on the disclosed embodiments relating to FIGS. 2-9B to determine whether the circuit needs to be modified. If a determination is made that the circuit needs further modification, the circuit is modified to generate and save a modified digital representation of the electronic circuit. The modifications to the digital representation of the electronic circuit may be performed automatically by the system. Alternatively, the system presents results of analysis and receives modifications to the digital representation of the electronic circuit, for example, modifications performed by a circuit designer using the EDA software 112. Once the digital representation of the electronic circuit is finalized, the digital representation of the electronic circuit is used for manufacturing or fabrication of a physical circuit based on the digital representation, for example, an integrated circuit.

Static Timing Analysis

Figure 2:
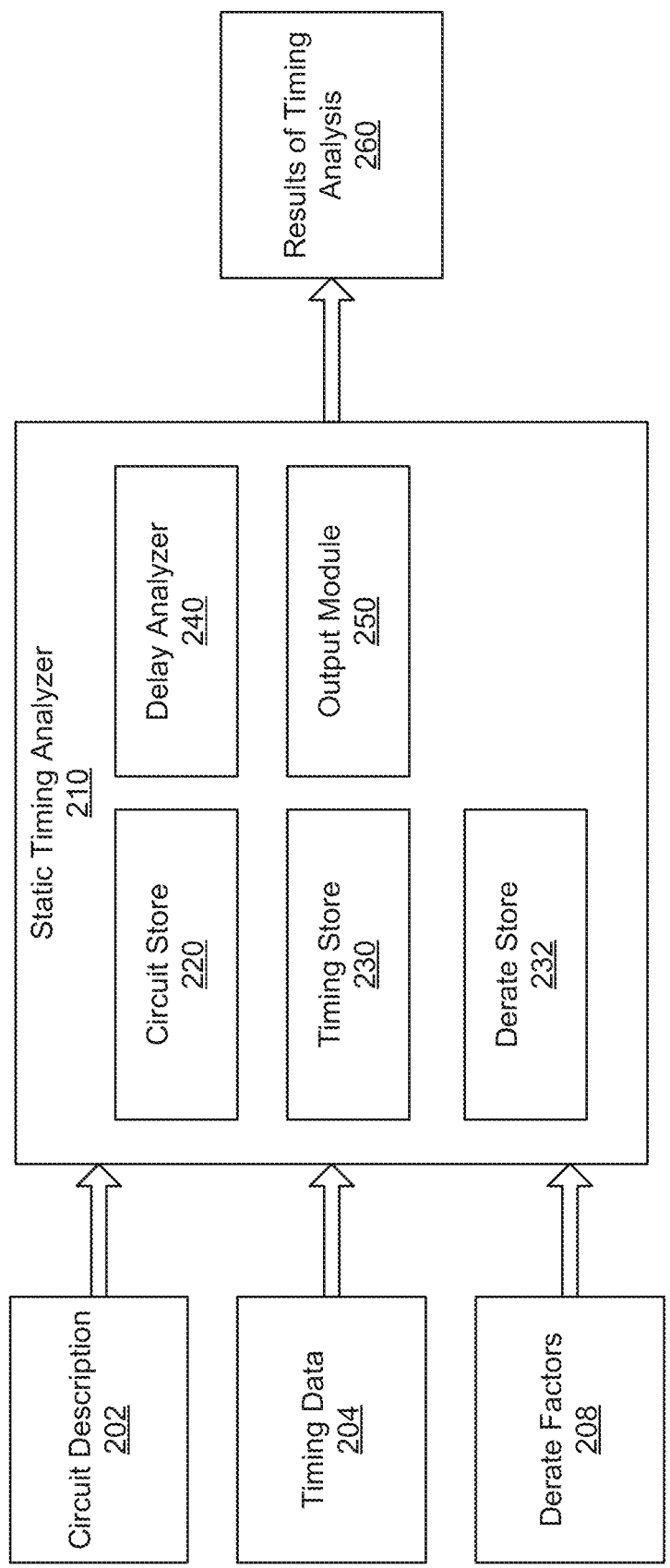
FIG. 2 illustrates a system architecture diagram showing various modules of a static timing analyzer, according to one embodiment.

FIG. 2 illustrates an overall system environment for performing static timing analysis of a digital representation of an electronic circuit using a static timing analyzer 210, according to one embodiment. The static timing analyzer 210 computes timing information for a circuit design. By using a static timing analyzer 210, a designer can determine whether the circuit design contains any timing violations, such as a hold time violation or a setup time violation.

The static timing analyzer 210 determines a timing slack for the various timing paths of the circuit design. As used herein, timing slack is the difference between the target delay time of a path and the determined delay time of the path determined by the static timing analyzer 210. A positive value for the slack indicates that the circuit design does not have a timing violation, and a negative value for the slack indicates that the circuit design has a timing violation.

The static timing analyzer 210 includes a circuit store 220, a timing store 230, a derate store, a delay analyzer 240 and an output module 250. In other embodiments, the static timing analyzer 210 can include additional, fewer, or different modules for various applications. Conventional components such as network interfaces, security mechanisms, load balancers, failover servers, management and network operations consoles, and the like are not shown so as to not obscure the details of the system.

In some embodiments, the static timing analyzer 210 receives a circuit description 202 and timing data 204 and performs static timing analysis of a circuit to generate results of timing analysis 260. The circuit description 202 is a digital representation of the circuit. In other embodiments, the static timing analyzer 210 receives a circuit description 202 and derate factors 208 and performs static timing analysis of a circuit to generate results of timing analysis 260. An example of results 260 is stage delay variation.

To increase efficiency of the static timing analysis, the circuit store 220 stores the circuit description 202 of a circuit being analyzed. The circuit description 202 includes a netlist, various constraints, etc. In one embodiment, the circuit store 220 represents the circuit using a graph representation in which nodes of the graph correspond to various stages (i.e., components) of the circuit and edges of the graph correspond to the connections between the various stages. The circuit includes one or more paths where each path includes one or more stages.

Various modelling formats for modelling integrated circuit (IC) implementation and signoff, such as advanced on-chip variation (AOCV) and parametric on-chip variation (POCV), have been consolidated into a single, unified open-source standard for industry-wide use, known as the Liberty Variation Format (LVF) extensions. The system analyzes a circuit in accordance with POCV methodology for statistical static timing analysis of circuits is described in the U.S. Pat. No. 8,407,640, filed on Aug. 23, 2011 and issued on Mar. 26, 2013, and U.S. Pat. No. 8,555,222, filed on Mar. 4, 2013 and issued on Oct. 8, 2013, each of which is incorporated by reference herein in its entirety.

The LVF extensions include timing data for intrinsic delay, intrinsic delay variation, transition time, and transition time variation for each stage of each path of the circuit. The intrinsic delay represents the processing delay of the stage. The processing delay of the stage can be due to intrinsic delay of the components of the stage. The intrinsic delay variation represents a timing impact of local random variation of the intrinsic delay. In other words, the intrinsic delay variation represents a square of the standard deviation of the intrinsic delay. The intrinsic delay variation can depend on process, voltage, temperature, crosstalk, etc. The transition time represents a slope of a signal waveform shape. More specifically, the transition time represents the time taken by a signal to change from a first value to a second value. For example, the transition time may represent the time taken by a signal to rise from a low signal value to a high signal value. Alternatively, the transition time may represent the time taken by a signal to fall from a high signal value to a low signal value. A small value of transition time indicates that the signal is changing from the first signal value to second signal value fast, resulting in a high slope of the signal waveform. Similarly, a large value of transition time indicates that the signal is changing from the first signal value to the second signal value slowly, resulting in a small slope of the signal waveform. The transition time variation represents a timing impact of local random variation of the transition time. Accordingly, the transition time variation represents a square of the standard deviation of the transition time.

The LVF extensions can further be used to compute timing data for approximating the delay through an RC network, for example, an Elmore delay, a nominal delay of a wire at an output of the wire, a nominal transition time at the output of the wire, a nominal transition time at an input of the wire, and a transition time variation at the input of the wire.

The timing data 204 represents the timing data of the LVF extensions. To increase the efficiency of the static timing analysis, the timing store 230 stores timing data including timing data 204. Specifically, the timing store 230 stores timing data for each stage of a path of the circuit. The timing store 230 further stores timing data output from the delay analyzer module 240 including induced delay variation, covariance delay and stage delay variation for each stage of each path of the circuit.

The derate factors 208 account for on-chip variations (OCVs). The derate factors 208 include global derate factors to be used for a circuit. To increase the efficiency of the static timing analysis, the derate store 232 stores the derate factors 208. The derate factors 208 can be received from the advanced on-chip variation (AOCV) data. Furthermore, the derate factors 208 can be represented as a derate table.

The delay analyzer module 240 determines the stage delay variation for each stage of each path of the circuit. In some embodiments, the delay analyzer module 240 determines the stage delay variation based on the intrinsic delay of the stage, the induced delay variation of the stage, and the covariance delay of the stage. In these embodiments, the delay analyzer module 240 determines the covariance delay of a current stage based on a current stage and a previous stage. In other embodiments, the delay analyzer module 240 determines stage delay variation based on an intrinsic delay standard deviation, a correlation coefficient, and a derating saturation value.

The output module 250 outputs the results of various computations, for example, stage delay variation from the delay analyzer module 240 to results of timing analysis 260. In some embodiments, the output module 250 further outputs the timing data in the timing store 230. In other embodiments, the output module 250 outputs the derate factors from the derate store 232.

Delay Analyzer

Figure 3:
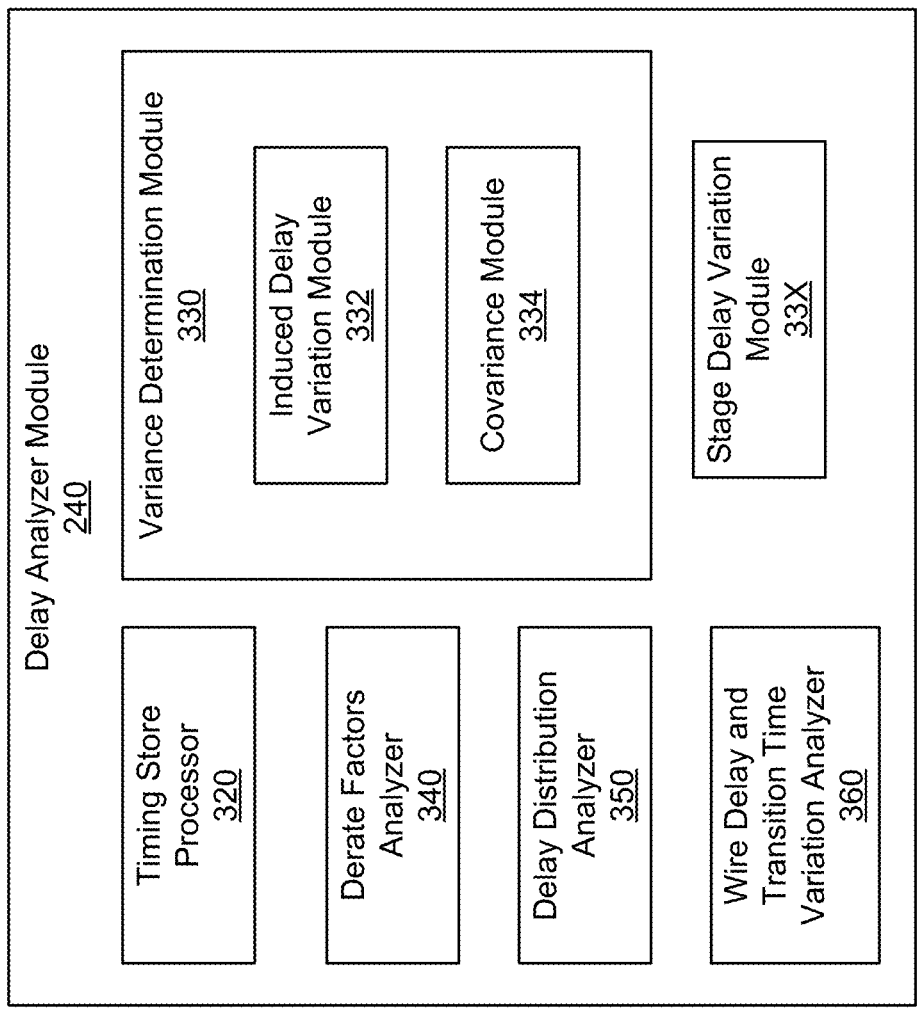
FIG. 3 illustrates a system architecture diagram showing various modules of a delay analyzer, according to one embodiment.

Referring now to FIG. 3, it illustrates the delay analyzer module 240, according to one embodiment. The delay analyzer module 240 includes a timing store processor 320, a variance determination module 330, a derate factors analyzer 340, a delay distribution analyzer 350, and a wire delay and transition time variation analyzer 360.

The timing store processor 320 processes timing data stored in the timing store 230 for each stage of the one or more stages of each path of the one or more paths of the circuit. The timing store 320 stores timing data representing intrinsic delay, intrinsic delay variation, transition time, and transition time variation for each stage of each path of the circuit.

The derate factors analyzer 340 receives the derate factors stored in the derate store 230 and determines stage delay variation each stage based on the intrinsic delay standard deviation, the correlation coefficient, and the derating saturation value. The delay analyzer module 240 determines stage delay variation of each stage based on the circuit description 202 stored in the circuit store 220 and the timing data 204 stored in the timing store 230.

The delay distribution analyzer 350 receives parameters describing delay values that represent an asymmetric delay distribution and generates parameters representing a normal distribution of the delay values. The static timing analyzer 210 uses the generated parameters to propagate the delay distribution values through stages of paths of the circuit for performing POCV analysis of the circuit.

The wire delay and transition time variation analyzer 360 determines a delay variation at an output of a wire and a transition time variation at an output of a wire. The analyzer 360 determines the delay variation at the output of the wire based on an estimate of a delay through an RC network, for example, an Elmore delay, a nominal delay of the wire at the output of the wire, a nominal transition time at the output of the wire, a nominal transition time at an input of the wire, and a transition time variation at the input of the wire. The analyzer 360 determines the transition time variation at the output of the wire based on the nominal transition time at the output of the wire, the nominal transition time at the input of the wire, and the transition time variation at the input of the wire.

I. Stage Delay Variation

To ensure timing requirements are met, a conservative estimate of stage delay variation is often used for performing timing analysis of circuits. Applying conservative estimates for paths with numerous stages can result in an estimated performance poorer than the actual performance and inaccurate timing violations may be generated. Traditional approaches for correcting the inaccurate timing violations decrease product performance and increase engineering cost. The disclosed embodiments provide less conservative and more accurate stage delay variation data, which can be used to improve product performance Stage delay variation comes from intrinsic stage process variation as well as input transition time variation. Input transition time variation is independent from intrinsic stage process variations of a current stage. However, input transition time variation is correlated from stage delay variations from a previous stage. Thus, there is a correlation between a delay of a current stage and a delay of a previous stage.

IA. Stage Delay Variation—Timing Data

In some embodiments, the static timing analyzer 210 receives a circuit description 202 and timing data 204 as input and performs static timing analysis of a circuit to generate results 260. Examples of results 260 include stage delay variation based on the intrinsic delay variation of the stage, the induced delay variation of the stage, and the covariance delay of the stage.

The variance determination module 330 determines induced delay variation, covariance delay, and stage delay variation for each stage of a path. The variance determination module 330 includes an induced delay variation module 332 and a covariance module 334. The induced delay variation module 332 and the covariance module 334 determine an induced delay variation and a covariance delay, respectively, based on timing data for a current stage and a previous stage.

The induced delay variation module 332 determines an induced delay variation based at least in part on the intrinsic delay of the current stage, the transition time of the previous stage, and the transition time variation of the previous stage. In an embodiment, the induced delay variation is based on a change in the intrinsic delay of the current stage divided by a change in the transition time of the previous stage, the quotient squared and multiplied by the transition time variation of the previous stage.

The covariance module 334 determines a covariance delay based at least in part on the intrinsic delay variation of the previous stage, the intrinsic delay of the current stage, the transition time of the previous stage, and the transition time variation of the previous stage. The covariance module 334 determines covariance terms that provide a measure of strength of correlation between two or more sets of variable. The covariance delay term is a measure of how much the intrinsic delay of the current stage and transition time of the previous stage change together. For example, the covariance delay can be based on a change in the intrinsic delay of the current stage divided by a change in the transition time of the previous stage, the quotient multiplied by the delay variation of the previous stage and the transition time variation of the previous stage.

The variance determination module 330 determines stage delay variation for each stage of the path based at least in part on the intrinsic delay variation, the induced delay variation determined by the induced delay variation module 332 and the covariance delay determined by the covariance module 334.

IB. Stage Delay Variation—Timing Data—Example

Figure 4:
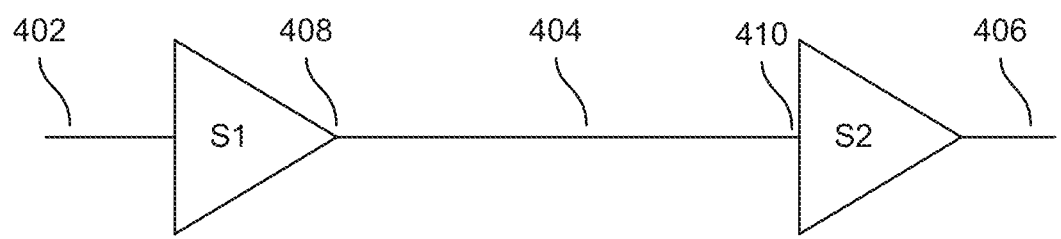
FIG. 4 illustrates a path including two stages, according to one embodiment.

FIG. 4 illustrates a path including two stages, according to one embodiment. A first stage S1 and a second stage S2 are connected via a wire 404. The first stage S1 receives input signal waveform 402 and the second stage S2 transmits outputs signal waveform 406. The input waveforms 402 and 406 are electrical signal waveforms.

Each of the first stage S1 and the second stage S2 have timing data associated with the stage. For example, the first stage S1 has intrinsic delay $D_1$, intrinsic delay variation $\sigma_{D_1}^2$, transition time $T_1$, and transition time variation $\sigma_{T_1}^2$. Similarly, the second stage S2 has nominal intrinsic delay $D_2$, intrinsic delay variation $\sigma_{D_2}^2$, nominal transition time $T_2$, and transition time variation $T_2$.

As previously mentioned, the induced delay variation and the covariance delay are based on a current stage and a previous stage. When calculating the stage delay variation for the first stage S1, the first stage S1 is the current stage and there is no previous stage. Therefore, the induced delay variation and the covariance delay of the first stage S1 are both zero. Thus, the stage delay variation of the first stage S1 is simply the intrinsic delay variation of the first stage.

When calculating the stage delay variation for the second stage S2, the second stage S2 is the current stage and the first stage S1 is the previous stage. The induced delay variation of the second stage S2 is a function of a ratio of the intrinsic delay $D_2$ of the second stage S2 and transition time $T_1$ of the first stage S1. Equation 1 represents a general form of the induced delay variation, $\sigma_{induced_2}^2$, of the second stage S2.

$$\sigma_{induced_2}^2 = f\left(\frac{D_2}{T_1}\right) \qquad \text{Equation 1}$$

Specifically, the induced delay variation of the second stage S2 is a function of a ratio of a change in the intrinsic delay $D_2$ of the second stage S2 and a change in the transition time $T_1$ of the first stage S1. Equation 2 represents the induced delay variation of the second stage S2 in this manner.

$$\sigma_{induced_2}^2 = f\left(\frac{\partial D_2}{\partial T_1}\right) \qquad \text{Equation 2}$$

The induced delay variation of the second stage S2 can be expressed as a square of the ratio of the change in the intrinsic delay $D_2$ of the second stage S2 and the change in the transition time $T_1$ of the first stage S1, the square of the ratio scaled by a constant m. Equation 3 represents the induced delay variation of the second stage S2 in this manner.

$$\sigma_{induced_2}^2 = f\left(\frac{\partial D_2}{\partial T_1}\right)^2 \cdot m \qquad \text{Equation 3}$$

The constant m represents the transition time variation of the first stage S1, $\sigma_{T_1}^2$. Equation 4 represents the induced delay variation of the second stage S2 in this manner.

$$\sigma_{induced_2}^2 = f\left(\frac{\partial D_2}{\partial T_1}\right)^2 \sigma_{T_1}^2 \qquad \text{Equation 4}$$

Similar to the induced delay variation of the second stage S2, the covariance delay of the second stage S2 is a function of a ratio of the intrinsic delay $D_2$ of the second stage S2 and the transition time $T_1$ of the first stage S1. Equation 5 represents a general form of the covariance delay, $COV_2$, of the second stage S2.

$$COV_2 = f\left(\frac{D_2}{T_1}\right) \qquad \text{Equation 5}$$

Again, similar to the induced delay variation of the second stage S2, the covariance delay of the second stage S2 is a function of a ratio of a change in the intrinsic delay $D_2$ of the second stage S2 and a change in the transition time $T_1$ of the first stage S1. Equation 6 represents the covariance delay of the second stage S2 in this manner.

$$COV_2 = f\left(\frac{\partial D_2}{\partial T_1}\right) \qquad \text{Equation 6}$$

The covariance delay of the second stage S2 can be expressed as the ratio of the change in the intrinsic delay $D_2$ of the second stage S2 and the change in the transition time $T_1$ of the first stage S1, the ratio scaled by a constant n. Equation 7 represents the covariance delay of the second stage in this manner.

$$COV_2 = \frac{\partial D_2}{\partial T_1} \cdot n \qquad \text{Equation 7}$$

The constant, n, can be the delay variation $\sigma_{D_1}^2$ of the first stage S1 scaled by the transition time variation $\sigma_{T_1}^2$ of the first stage S1 further scaled by another constant, p. In one embodiment, the constant p is 2. Equation 8 represents the covariance delay of the second stage S2, in this manner, where p is 2.

$$COV_2 = \frac{\partial D_2}{\partial T_1} \cdot \sigma_{D_1}^2 \cdot \sigma_{T_1}^2 \cdot 2 \qquad \text{Equation 8}$$

The stage delay variation of a current stage, k, is expressed as a function of timing data for the current stage, k, and a previous stage, k−1. Equation 9 represents the stage delay variation, $\sigma_{stage_k}^2$, for the current stage, k, as a function of the current stage, k, and the previous stage, k−1.

$$\sigma_{stage_k}^2 = f(k, k-1) \qquad \text{Equation 9}$$

The stage delay variation of the current stage, k, is the sum of the intrinsic delay variation, the induced delay variation and the covariance delay of the current stage, k, as a function of the previous stage, k−1, where applicable. Equation 10 represents the stage delay variation for the kth stage.

$$\sigma_{stage_k}^2 = \sigma_{D_k}^2 + \sigma_{induced_k}^2(k, k-1) + COV_k(k, k-1) \qquad \text{Equation 10}$$

$\sigma_{D_k}^2$ is the intrinsic delay variation of the kth stage, $\sigma_{induced_k}^2$ is the induced delay variation, and $COV_k$ is the covariance delay of the kth.

Equation 11 represents the stage delay variation of the current stage, k, based on timing data for the current stage, k, and the previous stage, k−1.

$$\sigma_{stage_k}^2 = \sigma_{D_k}^2 + \left(\left(\frac{\partial D_k}{\partial T_{k-1}}\right)^2 \sigma_{T_{k-1}}^2\right) + \left(\frac{\partial D_k}{\partial T_{k-1}} \cdot \sigma_{D_{k-1}}^2 \cdot \sigma_{T_{k-1}}^2 \cdot 2\right) \qquad \text{Equation 11}$$

Equation 11 can be modified to specifically relate to the example of FIG. 4 regarding the first stage S1 and the second stage S2. Equation 12 represents equation 11 as it applies to the example of FIG. 4 with reference to the first stage S1 and the second stage S2.

$$\sigma_{stage_2}^2 = \sigma_{D_2}^2 + \left(\left(\frac{\partial D_2}{\partial T_1}\right)^2 \sigma_{T_1}^2\right) + \left(\frac{\partial D_2}{\partial T_1} \cdot \sigma_{D_1}^2 \cdot \sigma_{T_1}^2 \cdot 2\right) \qquad \text{Equation 12}$$

Figure 5:
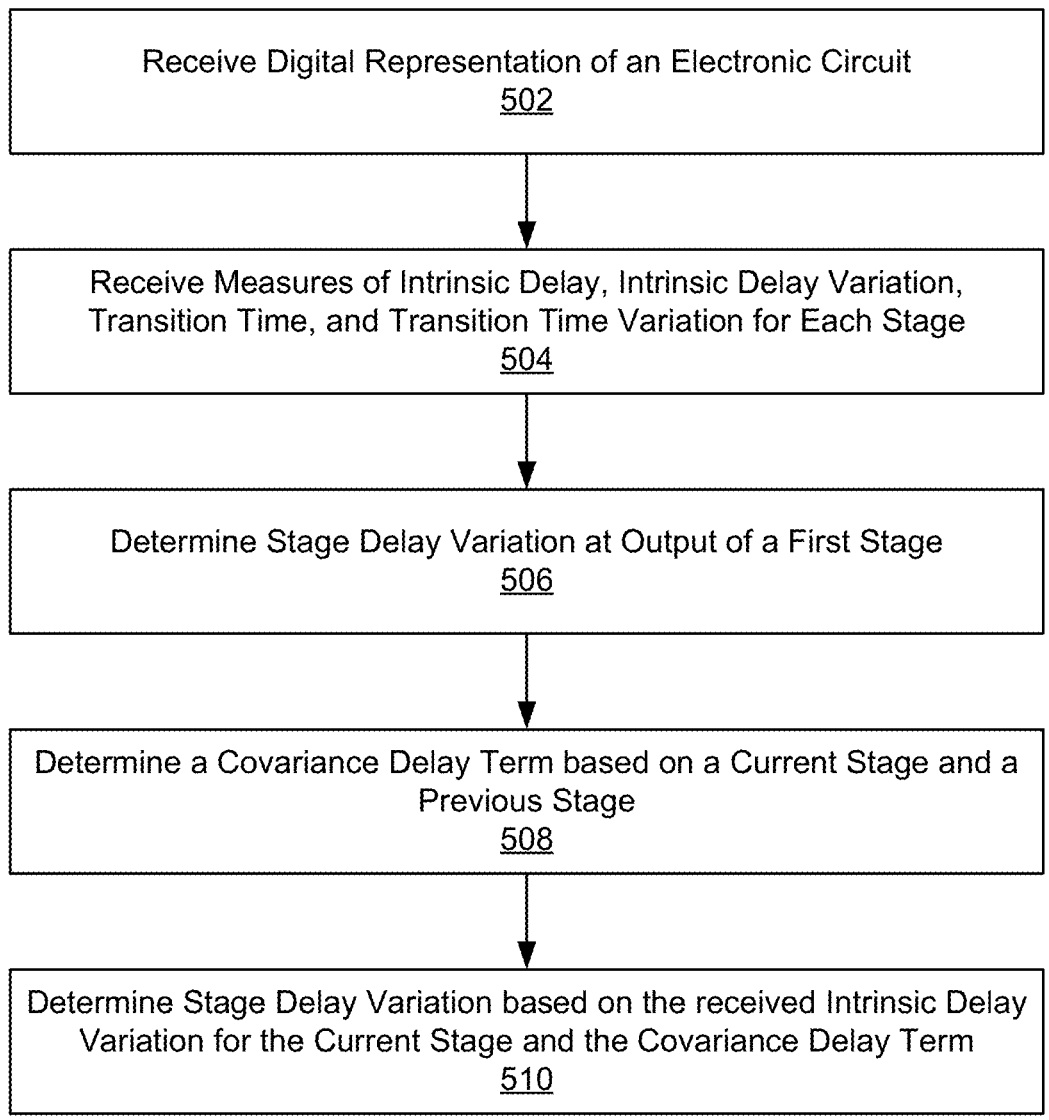
FIG. 5 is a flow diagram illustrating a process for determining stage delay variation based on intrinsic delay variation and a covariance delay term, according to one embodiment.

FIG. 5 illustrates a flow diagram of a method for determining stage delay variation, according to one embodiment. The flow diagram of FIG. 5 summarizes the method disclosed in sections IA and IB. The circuit store 220 receives 502 a digital representation of an electronic circuit. The timing store 230 receives 504 measures of intrinsic delay, intrinsic delay variation, transition time, and transition time variation for each stage of a plurality of stages for each path of a plurality of paths of the circuit. The variance determination module 330 determines 506 a stage delay variation at an output of a first stage of a path based the intrinsic delay variation of the first stage. For each stage of the one or more stages following the first stage of the path, the covariance module 334 determines 508 a covariance delay term based on a current stage and a previous stage. Furthermore, the variance determination module 330 determines 510 stage delay variation based on the intrinsic delay variation of the stage and the covariance delay term.

IC. Stage Delay Variation—Derate Factors

In some embodiments, the static timing analyzer 210 receives a circuit description 202 and derate factors 208 of a circuit as input and performs static timing analysis of a circuit to generate results 260. The circuit description 202 is a digital representation of the circuit. Examples of results 260 include stage delay variation based on the intrinsic delay standard deviation, the correlation coefficient, and the derating saturation value.

As mentioned previously, the derate factors 208 can be represented as a derate table. The derate table specifies a mapping from stage counts (i.e., number of stages of paths of the circuit) to the global derate factors. The global derate factors represent a measure of stage delay variation for paths having a given stage count, where the measure of stage delay variation is specified on a per stage basis. In one embodiment, the derate factors are irrespective of stage depth (e.g., number of stages from a beginning of a path) of a particular stage in the path. In other words, the same derate factor is applied to each stage of a path where the derate factor is a function of the number of stages in the path.

The derate factors analyzer 340 determines a plurality of parameters including the intrinsic delay standard deviation and the correlation coefficient. The intrinsic delay standard deviation represents a standard deviation of a processing delay of a stage and the correlation coefficient represents a correlation between a delay of a current stage and a delay of a previous stage. In one embodiment, the plurality of parameters further includes a derating saturation value for each stage in a path. The derating saturation value represents a measure of global derate factor values corresponding to large stage count values. Accordingly, the derating saturation value corresponds to a global derate factor value for stage count greater than a predetermined threshold value.

The derate factors analyzer 340 selects a plurality of values of stage counts and a corresponding plurality of values of global derate factors from the received mapping. The received mapping may be referred to as a first mapping.

In one embodiment, the derate factors analyzer 340 determines the plurality of parameters by fitting a curve to the selected plurality of values of the stage counts and the corresponding plurality of values of the global derate factors. In an embodiment, derate factors analyzer 340 determines a polynomial function representing the curve. The polynomial function maps stage counts to global derate factors. The polynomial may be a second degree polynomial, a third degree polynomial, or an $n^{th}$ degree polynomial where n is a value greater than or equal to 1. The curve represents a second mapping from stage counts to global derate factor values. For example, the derate factors analyzer 340 selects three values of stage count and corresponding global derating factors values from the received mapping and determines the plurality of parameters based on the selected values by fitting a curve.

In another embodiment, the derate factors analyzer 340 determines the plurality of parameters by solving a system of equations based on the selected plurality of values of stage counts and the corresponding plurality of values of the global derate factors. The system of equations represents a second mapping from stage counts to the global derate factor values. For example, regression and least square fitting can be used when solving the system of equations to minimize error of the determined parameters.

After computing the intrinsic delay standard deviation, the correlation coefficient, and the derating saturation value, the derate factors analyzer 340 calculates the stage delay variation for each stage in a path based on the intrinsic delay standard deviation and the correlation coefficient. In some embodiments, the derate factors analyzer 340 calculates only the intrinsic delay standard deviation and the correlation coefficient and calculates the stage delay variation for each stage in a path based on the intrinsic delay standard deviation and the correlation coefficient.

ID. Stage Delay Variation—Derate Factors—Example

A derate factor d can be expressed as a function of the stage depth n, the intrinsic delay standard deviation $\sigma_{intrinsic}$ and the correlation coefficient $\rho$. Equation 13 represents the derate factor d in this manner.

$$d = f(n, \sigma_{intrinsic}, \rho) \qquad \text{Equation 13}$$

Specifically, the derate factor, d, can be expressed as a function of a product of the stage count n, the intrinsic delay standard deviation $\sigma_{intrinsic}$, and the correlation coefficient $\rho$. Equation 14 represents the derate factor, d, in this manner.

$$d=f(n*\sigma_{intrinsic}*\rho) \quad \text{Equation 14}$$

Furthermore, the derate factor, d, can be expressed as a function of the stage count n, the intrinsic delay standard deviation $\sigma_{intrinsic}$, the correlation coefficient $\rho$, the derating saturation value $\alpha$ and a constant m. Equation 15 represents the derate factor, d, according to one example.

$$d = m + \alpha + 3\sigma_{intrinsic}\frac{\sqrt{n + 2\rho(n-1)}}{n} \quad \text{Equation 15}$$

In one example, the constant m is equal to 1.

As mentioned previously, the derate factors 208 represented as a derate table include a mapping from stage count (i.e., n) to global derate factors (i.e., derate factor d). In other words, the derate factor d is known for each stage count n. Equation 15 includes three unknowns: the intrinsic delay standard deviation $\sigma_{intrinsic}$, the correlation coefficient $\rho$, and the derating saturation value $\alpha$.

In one example, choosing three values for stage count n corresponds to three values for derate factors d leading to three equations with the three unknowns. The system of equations can be solved to determine the three unknowns. In another example, the derate factors d for all the stage counts n can be used to determine the three unknowns. Using derate factors d for all the stage counts along with regression and least square fitting can minimize error of the three unknowns.

The stage delay variation of a current stage, k, is expressed as a function of timing data for the current stage, k, and a previous stage, k−1. Equation 16 represents the stage delay variation, $\sigma_{stage_k}^2$, for the current stage, k, as a function of the current stage, k, and the previous stage, k−1.

$$\sigma_{stage_k}^2 = f(k, k-1) \quad \text{Equation 16}$$

The stage delay variation of the current stage, k, is the sum of the intrinsic delay variation, the induced delay variation and the covariance delay of the current stage, k, as a function of the previous stage, k−1, where applicable. Equation 17 represents the stage delay variation for the kth stage.

$$\sigma_{stage_k}^2 = \sigma_{intrinsic_k}^2 + \sigma_{induced_k}^2(k, k-1) + COV_k(k, k-1) \quad \text{Equation 17}$$

$\sigma_{intrinsic_k}^2$ is the intrinsic delay variation of the kth stage, $\sigma_{induced_k}^2$ is the induced delay variation, and $COV_k$ is the covariance delay of the kth.

Equation 17 can be simplified assuming the intrinsic delay variation $\sigma_{intrinsic}^2$ and the induced delay variation $\sigma_{induced}^2$ of all the stages are the same. Equation 18 represents a simplified version of equation 17 under the previously mentioned assumption.

$$\sigma_{stage_k}^2 = \sigma_k^2(1+2\rho) \quad \text{Equation 18}$$

$\rho$ is the derating saturation value and $\sigma_k^2$ is a square of the intrinsic delay standard deviation $\sigma_{intrinsic}$ of any stage in the path.

Figure 6:
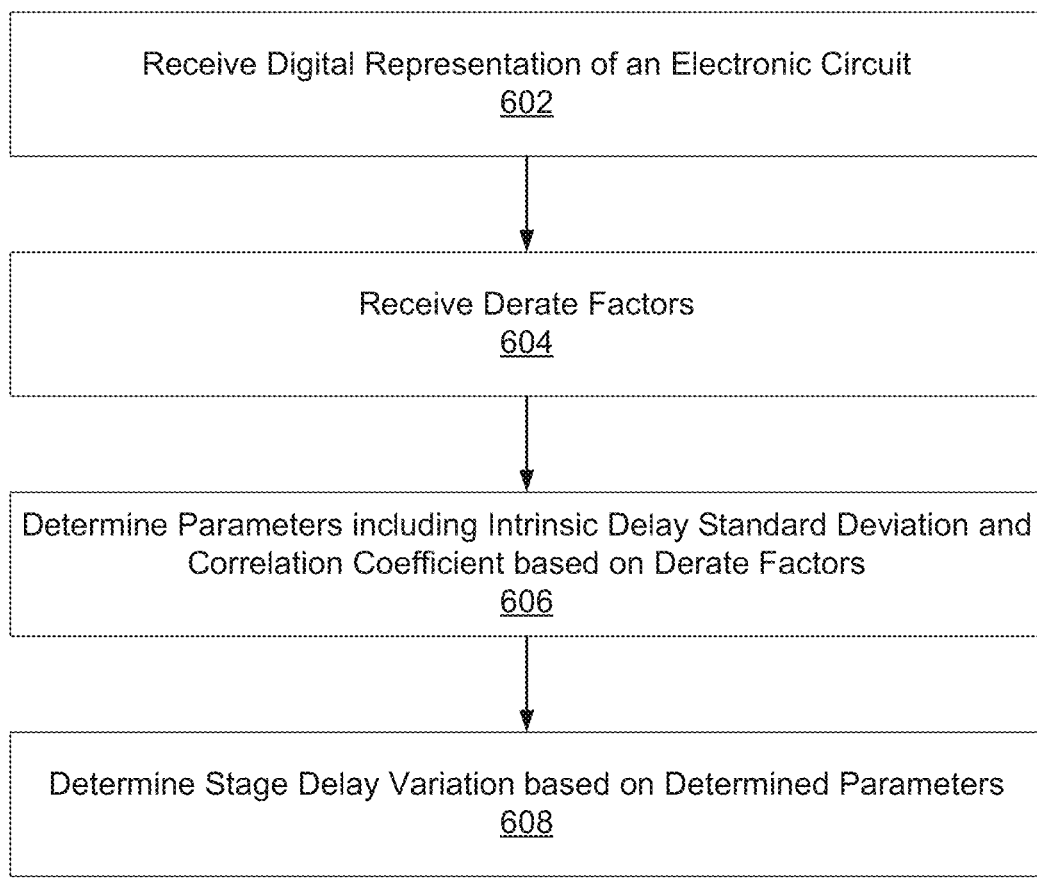
FIG. 6 is a flow diagram illustrating a process for determining stage delay variation based on intrinsic delay standard deviation and correlation coefficient, according to one embodiment.

FIG. 6 illustrates a flow diagram of a method of determining stage delay variation, according to another embodiment. The flow diagram of FIG. 6 summarizes the method disclosed in sections IC and ID. The circuit store 220 receives 602 a digital representation of an electronic circuit. The derate factors analyzer 340 receives 604 the derate factors 208 from the derate store 232. For example, the derate factors 208 may include a mapping from stage counts to global derate factors. The derate factors analyzer 340 determines 606 a plurality of parameters including the intrinsic delay standard deviation and the correlation coefficient based on the derate factors stored in the derate store 232. The derate factors analyzer 340 determines 608 the stage delay variation based on the determined plurality of parameters.

II. Generating Normal Distribution from Asymmetric Distribution of Stage Delays

At lower voltage, distributions of delay values of stages of electronic circuits show strong non-linearity and become asymmetric. Accordingly, the standard deviation for delay values that are greater than the mean delay value are different from the standard deviation for delay values that are lower than the mean delay value.

A stage library storing parameters used for analysis of an electronic circuit specifies a mean value for a delay distribution and parameters describing an asymmetric distribution of the delay values. These parameters include a first standard deviation value and a second standard deviation value. The first standard deviation is for delay values that are less than the mean value and the second standard deviation is for delay values that are higher than the mean value. The first standard deviation is referred to as an early sigma value and the second standard deviation value is referred to as a late sigma value. Propagating the asymmetric distribution using the POCV methodology causes the analysis based on early sigma values to become too pessimistic and the analysis based on late sigma values to become too optimistic. As a result, the POCV analysis is not accurate. The standard deviation of a distribution may also be referred to herein as a sigma value or sigma.

To alleviate the above issues with propagating asymmetric distribution of delays, the delay distribution analyzer 350 generates a normal distribution (or a Gaussian distribution) of delay values based on the asymmetric distribution of delay value parameters. The static timing analyzer 210 propagates the delay values based on the normal distribution in accordance with the POCV methodology.

The delay distribution analyzer 350 determines a nominal mean and nominal sigma values for the generated normal distribution of the delay values. The static timing analyzer 210 performs statistical static timing analysis of the circuit by propagating the nominal mean and nominal sigma values of the generated normal distribution through the stages of the circuit in accordance with the POCV methodology.

Figure 7:
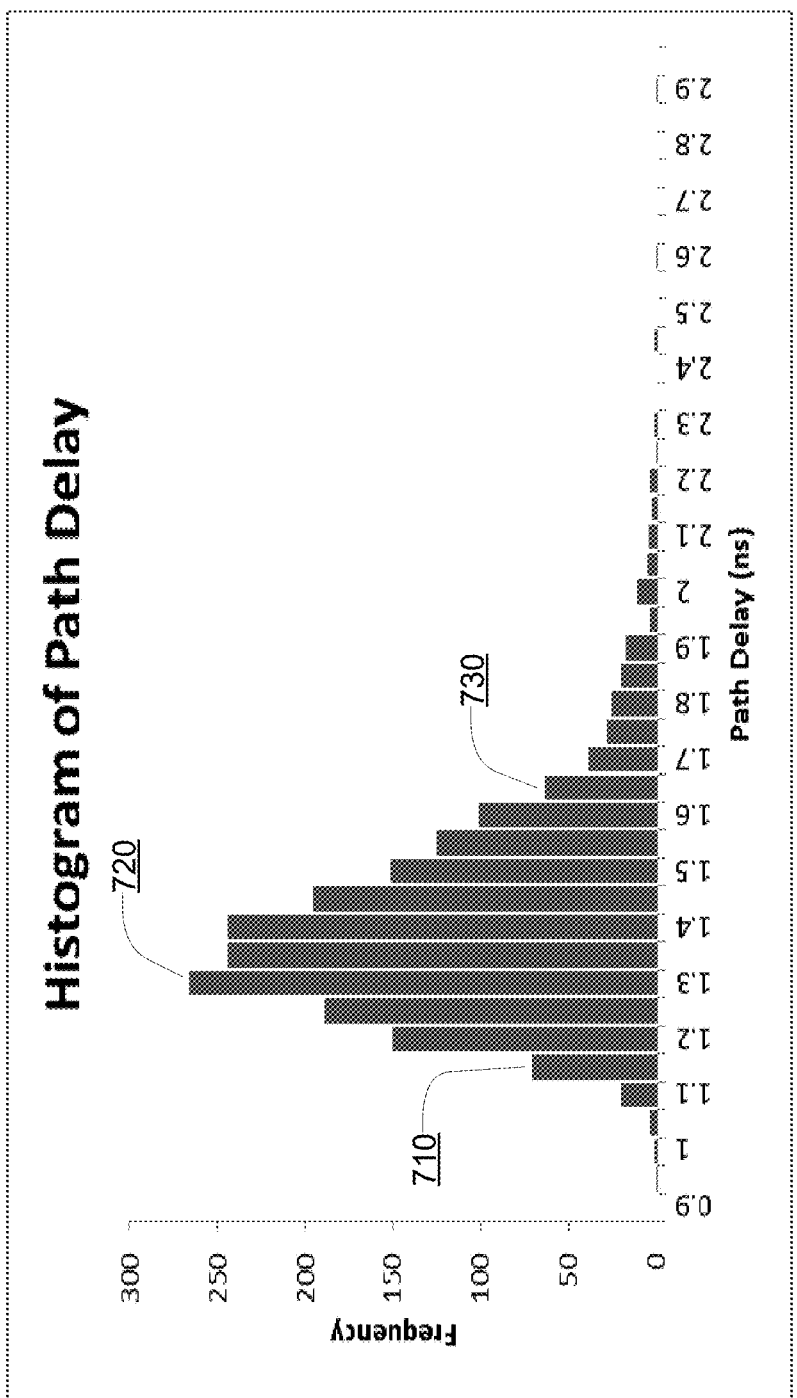
FIG. 7 illustrates an asymmetric distribution of delay values, according to an embodiment.

FIG. 7 illustrates an asymmetric distribution of delay values, according to an embodiment. FIG. 7 shows a histogram of path delays. Accordingly, the x-axis of the chart shown in FIG. 7 has delay values increasing from left to right and the y-axis shows the frequency of occurrence for a specific delay value. The delay distribution shown in FIG. 7 has a mean value, 720. The delay distribution has a first standard deviation value 710 for delay values that are below the mean value 720 and a second standard deviation value 730 for delay values above the mean value 720. As shown in FIG. 7, typically, the standard deviation 730 for delay values above the mean value 720 is larger than the standard deviation 710 for delay values below the mean value 720.

Figure 8:
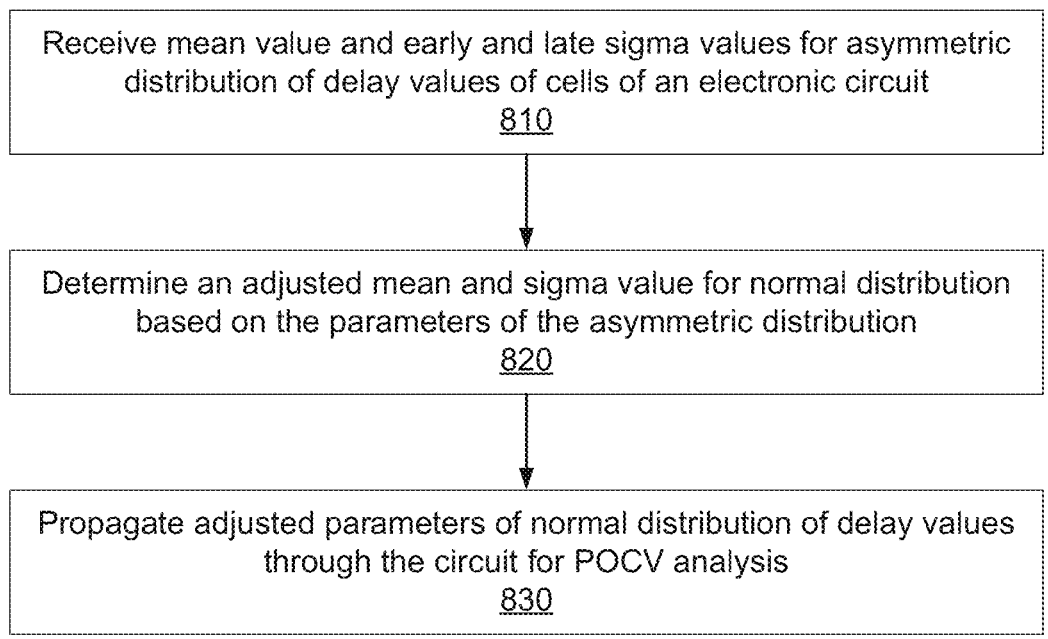
FIG. 8 is a flow diagram illustrating a process for generating a symmetric delay distribution from an asymmetric delay distribution of cells, according to one embodiment.

FIG. 8 is a flow diagram illustrating a process for generating a symmetric delay distribution from an asymmetric delay distribution of cells, according to one embodiment. The delay distribution analyzer 350 receives 810 parameters describing asymmetric distribution of delay values of cells of an electronic circuit including a mean value and early and late sigma values for the asymmetric distribution of delay values of the cells.

The delay distribution analyzer 350 determines 820 an adjusted mean and an adjusted sigma value for a normal distribution of delay values for the electronic circuit based on the parameters of the asymmetric distribution of delay values. The determined normal distribution is symmetric, i.e., the sigma values are same for delay values smaller than the mean value as well as for delay values larger than the mean value. In one embodiment, the delay distribution analyzer 350 determines parameters for an early normal distribution of delay values for an early mode analysis and parameters for a late normal distribution for a late mode analysis. Accordingly, two separate analyses are performed, an early mode analysis and a late mode analysis. However, the parameters used for both the analyses represent a normal or Gaussian distribution of delay values that is symmetric.

The static timing analyzer 210 propagates 830 the adjusted parameters, i.e., the adjusted mean value and the adjusted sigma value or values through cells of the electronic circuit to perform POCV analysis of the electronic circuit. In an embodiment, the static timing analyzer 210 propagates 830 the adjusted parameters by receiving parameters for input nodes of the circuit and following paths from the inputs to outputs of the circuit. For each stage in the path, the static timing analyzer 210 determines values of the adjusted parameters at the output of the stage based on the adjusted parameter values at the inputs of the stage and parameters of the stage. Accordingly, the static timing analyzer 210 determines the parameters of delay values (e.g., mean value and standard deviation values) at the outputs of the circuit based on the parameters of delay values at the inputs of the circuit and parameter of stages encountered in a path from the inputs to the outputs.

In one embodiment, the delay distribution analyzer 350 determines a mean shift value represented as $\Delta$ in equations described below. The mean shift value represents a parameter used for determining an amount by which the parameters of a distribution are shifted when they are adjusted for use in the POCV analysis of a circuit. The mean shift value $\Delta$ is determined based on the late sigma value and the early sigma values of the asymmetric distribution of delay values for the circuit. The delay distribution analyzer 350 determines the adjusted mean value and the adjusted sigma value of the normal distribution based on the mean shift value $\Delta$. In one embodiment, delay distribution analyzer 350 determines the mean shift value $\Delta$ based on a difference between the late sigma value and the early sigma value. The delay distribution analyzer 350 determines the mean shift value $\Delta$ as a product of the difference between the late sigma value and the early sigma value and an alpha factor $\alpha$, as shown in equation 19.

$$\Delta = \alpha \times (\rho_{late} - \rho_{early}) \qquad \text{Equation 19}$$

The value of the alpha factor $\alpha$ depends on a model used for analyzing the circuit. The delay distribution analyzer 350 further determines adjusted sigma values for a normal distribution of the delay values based on the mean shift value $\Delta$. In one embodiment, the delay distribution analyzer 350 further determines an adjusted early sigma value $\tilde{\sigma}_{early}$ for an early mode analysis and an adjusted late sigma value $\tilde{\sigma}_{late}$ for a late mode analysis. The early mode analysis uses an early normal distribution having the adjusted mean value of the distribution and the adjusted early sigma value $\tilde{\sigma}_{early}$ for performing the POCV analysis. The late mode analysis uses a late normal distribution having the adjusted mean value of the distribution and the adjusted late sigma value $\tilde{\sigma}_{late}$ for performing the POCV analysis According to one embodiment, the delay distribution analyzer 350 determines the adjusted early sigma value $\tilde{\sigma}_{early}$ as a sum of the early sigma $\sigma_{early}$ and a weighted mean shift value $\Delta$ as illustrated by equation 20. As shown in equation 20, the mean shift value $\Delta$ is divided by a factor n before being added to the early sigma $\sigma_{early}$ for determining the adjusted early sigma value $\tilde{\sigma}_{early}$. The factor n represents a user specified number of sigma values for use in the timing analysis.

$$\tilde{\sigma}_{early} = \sigma_{early} + \Delta/n \qquad \text{Equation 20}$$

According to one embodiment, the delay distribution analyzer 350 determines the adjusted late sigma value $\tilde{\sigma}_{late}$ as a sum of the late sigma $\sigma_{late}$ and a weighted mean shift value $\Delta$ as illustrated by equation 21. As shown in equation 21, the mean shift value $\Delta$ is divided by the factor n before being subtracted from the late sigma $\sigma_{late}$ for determining the adjusted late sigma value $\tilde{\sigma}_{late}$ $$\tilde{\sigma}_{late} = \sigma_{late} - \Delta/n \qquad \text{Equation 21}$$

In one embodiment, the delay distribution analyzer 350 determines the adjusted mean value $\mu_{new}$ by adding the mean shift value $\Delta$ of the asymmetric distribution received as input as illustrated by equation 22.

$$\mu_{new} = \mu_{old} + \Delta \qquad \text{Equation 22}$$

There are three methods or models for determining the value of $\alpha$ according to different embodiments. The first method models the delay variation as sum of multiple two-piece normal distributions as described by equation 23, where x is a unified normal distribution.

$$\text{delay} = \Sigma d_i \text{ where } d_i = \begin{cases} a_1 x & (x < 0) \\ a_2 x & (x \geq 0) \end{cases} \qquad \text{Equation 23}$$

According to equation 23, the delay is modeled differently for values of x<0 and values of x≥0. Under this model, the value of A is obtained by calculating the mean value of the above delay function. Accordingly, the value of $\alpha$ is determined to be as shown in equation 24.

$$\alpha = \frac{1}{\sqrt{2\pi}} \qquad \text{Equation 24}$$

In one embodiment, the delay distribution analyzer 350 uses a value of $\alpha$ that is substantially equal to $$\frac{1}{\sqrt{2\pi}},$$

i.e., within a small predetermined threshold value of $$\frac{1}{\sqrt{2\pi}}..$$

Based on the value of $\alpha$ as shown in equation 24, the delay distribution analyzer 350 determines the value of $\Delta$ as shown in equation 25.

$$\Delta = \frac{1}{\sqrt{2\pi}} \cdot (\sigma_{late} - \sigma_{early}) \qquad \text{Equation 25}$$

The second method models the delay variation as a single split-normal distribution as shown in equation 26. In equation 26, the probability distribution function (PDF) is the probability density function and exp is the exponential function.

$$PDF(x) = \begin{cases} \dfrac{2}{\sqrt{2\pi}\,(\sigma_{early} + \sigma_{late})} \exp\left(-\dfrac{x^2}{2\sigma_{early}^2}\right) & (x < 0) \\ \dfrac{2}{\sqrt{2\pi}\,(\sigma_{early} + \sigma_{late})} \exp\left(-\dfrac{x^2}{2\sigma_{late}^2}\right) & (x \geq 0) \end{cases} \qquad \text{Equation 26}$$

Under this model, the value of $\Delta$ is determined by calculating the mean value of the above delay distribution. According to the second model the value of $\alpha$ is determined to be as shown in equation 27.

$$\alpha = \sqrt{\frac{2}{\pi}} \qquad \text{Equation 27}$$

In one embodiment, the delay distribution analyzer 350 uses a value of $\alpha$ that is substantially equal to $$\sqrt{\frac{2}{\pi}},$$

i.e., within a small predetermined threshold value of $$\sqrt{\frac{2}{\pi}}.$$

Based on the above value of $\alpha$, the delay distribution analyzer 350 determines the value of $\Delta$ as shown in equation 28.

$$\Delta = \sqrt{\frac{2}{\pi}} \cdot (\sigma_{late} - \sigma_{early}) \qquad \text{Equation 28}$$

The third model is based on a bounding method that ensures that the transformed distribution cumulative distribution function (CDF) completely bounds the CDF of computed delay distribution from negative n sigma to positive n sigma where n is the user specified number of sigma. According to the third model the value of $\alpha$ is shown in equation 29.

$$a = \frac{n}{2} \qquad \text{Equation 29}$$

In one embodiment, the delay distribution analyzer 350 uses a value of $\alpha$ that is substantially equal to $$\frac{n}{2},$$

i.e., within a small predetermined threshold value of $$\frac{n}{2}.$$

Based on the above value of $\alpha$, the delay distribution analyzer 350 determines the value of $\Delta$ as shown in equation 30.

$$\Delta = \frac{n}{2} \cdot (\sigma_{late} - \sigma_{early}) \qquad \text{Equation 30}$$

In this embodiment, the delay distribution analyzer 350 determines the value of adjusted mean $\mu_{new}$ for the normal distribution using the equation 31.

$$\mu_{new} = \mu_{old} + n\frac{\sigma_{late} - \sigma_{early}}{2} \qquad \text{Equation 31}$$

In general the delay distribution analyzer 350 determines the nominal standard deviation $\sigma_{new}$ as a weighted aggregate of the late sigma ($\sigma_{late}$) and early sigma ($\sigma_{early}$) values. In equation 32, $w_1$ and $w_2$ are weights assigned to the terms $\sigma_{late}$ and $\sigma_{early}$ respectively.

$$\sigma_{new} = w_1 \times \sigma_{late} + w_2 \times \sigma_{early} \qquad \text{Equation 32}$$

In one embodiment, both $w_1$ and $w_2$ have the same constant value. For example, the weights $w_1$ and $w_2$ have values substantially equal to the constant value $$\frac{1}{2}.$$

Accordingly, the nominal standard deviation $\sigma_{new}$ is determined using equation 33.

$$\sigma_{new} = \frac{\sigma_{late} + \sigma_{early}}{2} \qquad \text{Equation 33}$$

III. Wire Propagation Delay and Fanout Transition Time Variation

Wires, which connect different stages of a path, can cause wire propagation delays. Wire propagation delays can be accurately computed after a wire layout of the path is known. Embodiments determine wire propagation delay by modelling the wire as an RC network. Embodiments perform a method of propagating transition time variation from an input of an RC network to an output of the RC network. Embodiments determine the wire propagation delay based on a closed form expression for wire propagation delay of wires of a path.

Referring to FIG. 4, it illustrates a path including two stages, according to one embodiment. A wire 404 connects a first stage S1 and a second stage S2. A first end 408 of the wire 404 is connected to an output of the first stage S1 and a second end 410 of the wire 404 is connected to an input of the second stage S2. The first end 408 of the wire 404 can be referred to as an input 404 of the wire 404 and the second end 410 of the wire 404 can be referred to as an output 410 of the wire 404. Accordingly, the first end 408 of the wire 404 is an input to the RC network and the second end 410 of the wire 404 is an output of the RC network.

The wire delay and transition time variation analyzer 360 determines a delay variation at an output of a wire and a transition time variation at an output of a wire. The analyzer 360 can determine the delay variation at the output of the wire and the transition time variation at the output of the wire for each wire of a path (i.e., all each wire connecting a stage to another stage).

The wire delay and transition time variation analyzer 360 determines the delay variation at the output of the wire based on the timing data in the timing store 230 including the Elmore delay, the nominal delay of the wire at the output of the wire, the nominal transition time at the output of the wire, the nominal transition time at the input of the wire, and the transition time variation at the input of the wire. The delay variation of a wire (e.g., wire 404) at an output of the wire $\Delta d_o$ is modeled as a function of a difference of an estimate of a delay through an RC network, for example, an Elmore delay $d_e$ and a nominal delay of the wire at the output of the wire $d_o$. Equation 34 represents the delay variation of the wire in this manner.

$$\Delta d_o = f(d_e - d_o) \qquad \text{Equation 34}$$

The Elmore delay $d_e$ is an approximation of a delay through an RC network. The Elmore delay $d_e$ is simple to compute and provides an upper bound for the wire propagation delay. However, the Elmore delay $d_e$ alone is not very accurate for static timing analysis.

The delay variation of the wire at the output of the wire $\Delta d_o$ can be expressed as a product of the difference of the Elmore delay $d_e$ and the nominal delay of the wire at the output of the wire $d_o$ and a function of a nominal transition time at the output of the wire $T_o$, a nominal transition time at the input of the wire $T_i$, and a transition time variation at the input of the wire $\Delta T_i$. Equation 35 represents the delay variation at the output of the wire $\Delta d_o$ in this manner.

$$\Delta d_o = (d_e - d_o) * f(T_o, T_i, \Delta T_i) \qquad \text{Equation 35}$$

The function $f(T_o, T_i, \Delta T_i)$ includes a ratio of a first term and a second term, where the first term is a function of $T_o$ and the second term is a function of $T_o$, $T_i$, and $\Delta T_i$. In one embodiment, the first term is $T_o^2$ and the second term is $T_o^2 + 2T_i \Delta T_i + \Delta T_i^2$. Equation 36 represents the delay variation at the output of the wire $\Delta d_o$ as a function of $d_e$, $d_o$, $T_o$, $T_i$, and $\Delta T_i$ represented according to one embodiment.

$$\Delta d_o = (d_e - d_o) * \left(1 - \left(\frac{T_o^2}{T_o^2 - 2T_i \Delta T_i + \Delta T_i^2}\right)^{\frac{5}{2}}\right) \qquad \text{Equation 36}$$

The wire delay and transition time variation analyzer 360 determines the transition time variation at the output of the wire based on the nominal transition time at the output of the wire, the nominal transition time at the input of the wire, and the transition time variation at the input of the wire.

A transition time variation at an output of a wire $\Delta T_o$ is modeled as a function a difference of a first term and a second term, where the first term is a function of $T_o$, $T_i$, and $\Delta T_i$ and the second term is a function of $T_o$. Equation 37 represents the transition time variation at the output of the wire $\Delta T_o$ in this manner.

$$\Delta T_o = f(f(T_o, T_i, \Delta T_i) - f(T_o)) \qquad \text{Equation 37}$$

In one embodiment, the first term is $T_o^2 + 2T_i \Delta T_i + \Delta T_i^2$ and the second term is $T_o$. Equation 38 represents the transition time variation at the output of the wire $\Delta T_o$ as a function of $T_o$, $T_i$, and $\Delta T_i$, represented according to one embodiment.

$$\Delta T_o = \sqrt{T_o^2 + 2T_i \Delta T_i + \Delta T_i^2} - T_o \qquad \text{Equation 38}$$

Figure 9A:
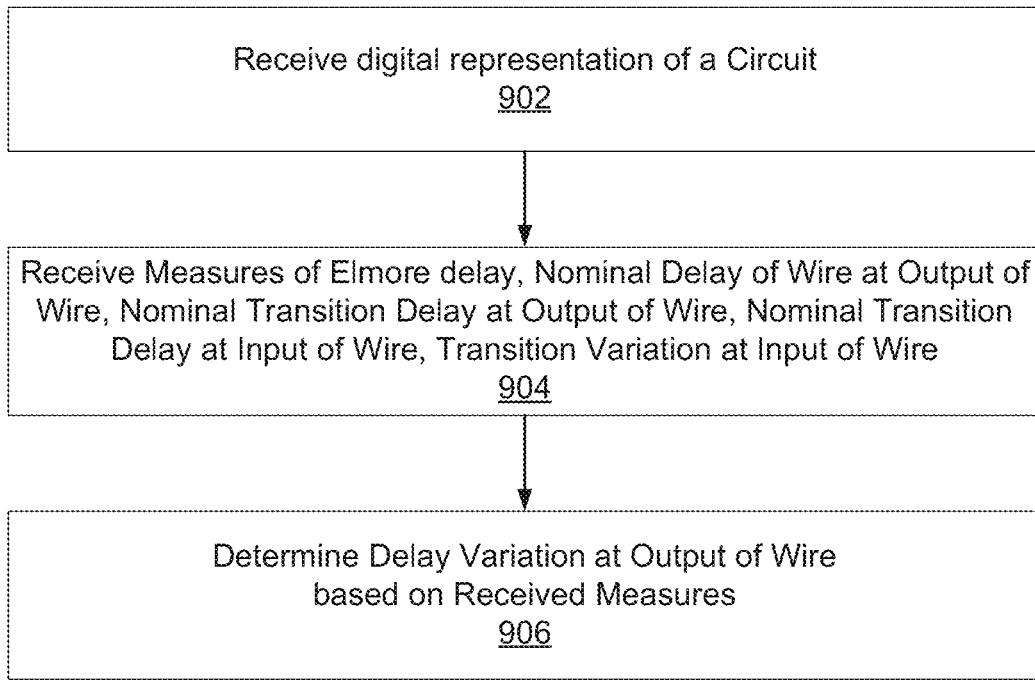
FIG. 9A is a flow diagram illustrating a process for determining a delay variation at an output of a wire, according to one embodiment.

FIG. 9A illustrates a flow diagram of a method for determining delay variation at an output of a wire, according to one embodiment. The circuit store 220 receives 902 a digital representation of an electronic circuit. The timing store receives 904 measures of the Elmore delay, the nominal delay of the wire at the output of the wire, the nominal transition time at the output of the wire, the nominal transition time at the input of the wire, and the transition time variation at the input of the wire. The wire delay and transition time variation analyzer 360 determines 906 the delay variation of the wire at the output of the wire based on the Elmore delay, the nominal delay of the wire at the output of the wire, the nominal transition time at the output of the wire, the nominal transition time at the input of the wire, and the transition time variation at the input of the wire.

Figure 9B:
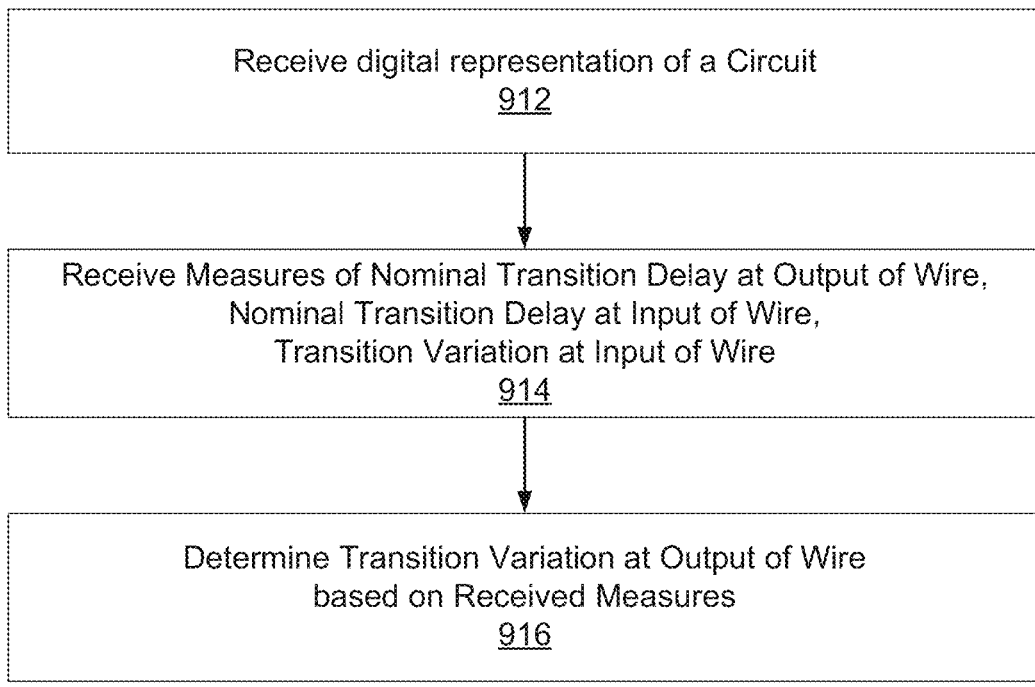
FIG. 9B is a flow diagram illustrating a process for determining a transition time variation at an output of a wire, according to one embodiment.

FIG. 9B illustrates a flow diagram of a method for determining transition time variation at an output of a wire, according to one embodiment. The circuit store 220 receives 912 a digital representation of an electronic circuit. The timing store receives 914 measures of the nominal transition time at the output of the wire, the nominal transition time at the input of the wire, and the transition time variation at the input of the wire. The wire delay and transition time variation analyzer 360 determines 916 the transition time variation of the wire at the output of the wire based on the nominal transition time at the output of the wire, the nominal transition time at the input of the wire, and the transition time variation at the input of the wire.

Computing Machine Architecture

FIG. 10 is a block diagram illustrating components of an example machine able to read instructions from a machine-readable medium and execute them in a processor (or controller). Specifically, FIG. 10 shows a diagrammatic representation of a machine in the example form of a computer system 1000 within which instructions 1024 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1024 (sequential or otherwise) that specify actions to be taken by that machine. Further, while only a single machine is illustrated, the term "machine" shall also be taken to include any collection of machines that individually or jointly execute instructions 1024 to perform any one or more of the methodologies discussed herein.

The example computer system 1000 includes a processor 1002 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1004, and a static memory 1006, which are configured to communicate with each other via a bus 1008. The computer system 1000 may further include graphics display unit 1010 (e.g., a plasma display panel (PDP), a liquid crystal display (LCD), a projector, or a cathode ray tube (CRT)). The computer system 1000 may also include alphanumeric input device 1012 (e.g., a keyboard), a cursor control device 1014 (e.g., a mouse, a trackball, a joystick, a motion sensor, or other pointing instrument), a storage unit 1016, a signal generation device 1018 (e.g., a speaker), and a network interface device 1020, which also are configured to communicate via the bus 1008.

The storage unit 1016 includes a machine-readable medium 1022 on which is stored instructions 1024 (e.g., software) embodying any one or more of the methodologies or functions described herein. The instructions 1024 (e.g., software) may also reside, completely or at least partially, within the main memory 1004 or within the processor 1002 (e.g., within a processor's cache memory) during execution thereof by the computer system 1000, the main memory 1004 and the processor 1002 also constituting machine-readable media. The instructions 1024 (e.g., software) may be transmitted or received over a network 1026 via the network interface device 1020.

While machine-readable medium 1022 is shown in an example embodiment to be a single medium, the term "machine-readable medium" should be taken to include a single medium or multiple media (e.g., a centralized or distributed database, or associated caches and servers) able to store instructions (e.g., instructions 1024). The term "machine-readable medium" shall also be taken to include any medium that is capable of storing instructions (e.g., instructions 1024) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

While particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A non-transitory computer readable storage medium configured to store computer code comprising instructions, the instructions, when executed by a computer processor, cause the computer processor to:
receive a digital representation of an electronic circuit, the circuit comprising paths, wherein at least a path of the circuit comprises a plurality of stages;
receive from a library, for each stage of the path an intrinsic delay variation;
determine, for a first stage of the path, a stage delay variation at an output of the first stage based on the intrinsic delay variation of the first stage; and
for a second stage of the plurality of stages, wherein an input of the second stage is coupled to an output of the first a previous stage:
determine a covariance delay term based on an intrinsic delay of the second stage and a transition time of the first stage; and
determine stage delay variation based on the intrinsic delay variation of the second stage and the covariance delay term.

2. The non-transitory computer readable storage medium of claim 1, further comprising instructions that when executed by the computer processor cause the computer processor to:
receive a modified digital representation of the electronic circuit, wherein the electronic circuit is modified based on the determined stage delay variation.

3. The non-transitory computer readable storage medium of claim 2, further comprising instructions that when executed by the computer processor cause the computer processor to:
transmit the modified digital representation of the electronic circuit for fabrication of the electronic circuit.

4. The non-transitory computer readable storage medium of claim 1, wherein the instructions further cause the computer processor to receive for each stage of the path, measures of intrinsic delay, transition time, and transition time variation, wherein the intrinsic delay represents processing delay of a stage, the intrinsic delay variation represents a timing impact of local random variation of the intrinsic delay, the transition time represents a slope of a signal waveform, and the transition time variation represents a timing impact of local random variation of the transition time.

5. The non-transitory computer readable storage medium of claim 1, further comprising instructions that when executed by the computer processor cause the computer processor to:
determine an induced delay variation term based on the second stage and the first stage; and
wherein the determined stage delay variation is further based on the induced delay variation term.

6. The non-transitory computer readable storage medium of claim 5, wherein the determined induced delay variation term is based on the intrinsic delay of the second stage and a transition time of the first stage.

7. The non-transitory computer readable storage medium of claim 6, wherein the determined induced delay variation is further based on a transition time variation of the first stage.

8. The non-transitory computer readable storage medium of claim 5, wherein the determined stage delay variation is further based on the intrinsic delay variation of the second stage.

9. The non-transitory computer readable storage medium of claim 1, wherein the covariance delay term is determined based on a ratio of a change in the intrinsic delay of the stage and a change in the transition time of the stage.

10. The non-transitory computer readable storage medium of claim 1, wherein the covariance delay term is determined further based on an intrinsic delay variation of the first stage.

11. The non-transitory computer readable storage medium of claim 1, wherein the covariance delay term is determined further based on a transition time variation of the first stage.

12. A method comprising:
receiving a digital representation of an electronic circuit, the circuit comprising paths, wherein at least a path of the circuit comprises a plurality of stages;

receiving from a library, for each stage of the path an intrinsic delay variation;

determining, for a first stage of the path, a stage delay variation at an output of the first stage based on the intrinsic delay variation of the first stage; and for a second stage of the plurality of stages, wherein an input of the second stage is coupled to an output of the first a stage:

determining a covariance delay term based on an intrinsic delay of the second stage and a transition time of the first stage; and determining stage delay variation based on the intrinsic delay variation of the second stage and the covariance delay term.

13. The method of claim 12, further comprising:

receiving a modified digital representation of the electronic circuit, wherein the electronic circuit is modified based on the determined stage delay variation.

14. The method of claim 13, further comprising:

transmitting the modified digital representation of the electronic circuit for fabrication of the electronic circuit.

15. The method of claim 12, further comprising receiving for each stage of the path, measures of intrinsic delay, transition time, and transition time variation, wherein the intrinsic delay represents processing delay of a stage, the intrinsic delay variation represents a timing impact of local random variation of the intrinsic delay, the transition time represents a slope of a signal waveform, and the transition time variation represents a timing impact of local random variation of the transition time.

16. The method of claim 12, further comprising:

determining an induced delay variation term based on the second stage and the first stage; and wherein the determined stage delay variation is further based on the induced delay variation term.

17. The method of claim 16, wherein the determined induced delay variation term is based on the intrinsic delay of the second stage and a transition time of the first stage.

18. The method of claim 17, wherein the determined induced delay variation is further based on a transition time variation of the first stage.

19. The method of claim 16, wherein the determined stage delay variation is further based on the intrinsic delay variation of the second stage.

20. A computer system comprising:

a computer processor; and a non-transitory computer readable storage medium configured to store computer code comprising instructions, the instructions, when executed by a computer processor, cause the computer processor to:

receive a digital representation of an electronic circuit, the circuit comprising paths, wherein at least a path of the circuit comprises a plurality of stages;

receive from a library, for each stage of the path an intrinsic delay variation;

determine, for a first stage of the path, a stage delay variation at an output of the first stage based on the intrinsic delay variation of the first stage; and for a second stage of the plurality of stages, wherein an input of the second stage is coupled to an output of the first stage:

determine a covariance delay term based on an intrinsic delay of the second stage and a transition time of the first stage; and determine stage delay variation based on the intrinsic delay variation of the first stage and the covariance delay term.

\* \* \* \* \*